United States Patent
Raju et al.

(10) Patent No.: US 10,033,298 B1
(45) Date of Patent: Jul. 24, 2018

(54) AUTOMATIC SHORT CIRCUIT PROTECTION SWITCHING DEVICE SYSTEMS AND METHODS

(71) Applicant: General Electric Company, Schenectady, NY (US)

(72) Inventors: Ravisekhar Nadimpalli Raju, Clifton Park, NY (US); Ramanujam Ramabhadran, Schenectady, NY (US); Ljubisa Dragoljub Stevanovic, Clifton Park, NY (US); William George Earls, Schenectady, NY (US)

(73) Assignee: GENERAL ELECTRIC COMPANY, Schenectady ( * ) Notice: Subject to any disclaimer, the term of this patent is extended or adjusted under 35 U.S.C. 154(b) by 0 days.

(21) Appl. No.: 15/411,422

(22) Filed: Jan. 20, 2017

(51) Int. Cl.
- *H02M 7/217* (2006.01)
- *H02M 1/32* (2007.01)
- *H02M 1/08* (2006.01)

(52) U.S. Cl.
CPC .......... *H02M 7/217* (2013.01); *H02M 1/08* (2013.01); *H02M 1/32* (2013.01)

(58) Field of Classification Search
CPC .......... H02M 1/08; H02M 1/32; H02M 7/217; H02M 7/2173
See application file for complete search history.

(56) References Cited

U.S. PATENT DOCUMENTS

| | | | |
|---|---|---|---|
| 6,614,281 B1 * | 9/2003 | Baudelot | H03K 17/0828 327/321 |
| 6,822,842 B2 | 11/2004 | Friedrichs et al. | |
| 7,768,758 B2 | 8/2010 | Maier et al. | |

(Continued)

FOREIGN PATENT DOCUMENTS

EP 2858221 A1 4/2015

OTHER PUBLICATIONS

Bhalla et al., "Robustness of SiC JFETs and Cascodes", Bodo's Power Systems, pp. 48-50, http://unitedsic.com/wp-content/uploads/2016/02/bp_2015_05-Robustness-of-SiC-JFETs.pdf, May 2015.

Sadik et al., "Short-Circuit Protection Circuits for Silicon-Carbide Power Transistors", IEEE Transactions on Industrial Electronics, vol. 63, Issue 4, pp. 1995-2004, Apr. 2016.

(Continued)

*Primary Examiner* — Fred E Finch, III
(74) *Attorney, Agent, or Firm* — GE Global Patent Operation; Nitin Joshi

(57) ABSTRACT

Systems and methods for providing automatic short circuit protection in an electrical system via a switching device. In some embodiments, the switching device includes a switching transistor that selectively switches between an open position and a closed position based at least in part on a switching control signal, for example, to facilitate converting electrical power with first electrical characteristics output into electrical power with the second electrical characteristics. Additionally, the switching device includes a protection transistor electrically coupled in series with the switching transistor, in which a constant gate voltage is supplied to the protection transistor to maintain the first protection transistor in the closed position during operation of the power converter; and the protection transistor automatically limits current flow through the first switching device by reducing a gate voltage applied to the switching transistor when a short circuit is expected to be present in the electrical system.

19 Claims, 4 Drawing Sheets

(56) References Cited

U.S. PATENT DOCUMENTS

| | | | |
|---|---|---|---|
| 7,777,553 B2 * | 8/2010 | Friedrichs | H03K 17/6871 |
| | | | 327/436 |
| 8,228,114 B1 * | 7/2012 | Cilio | H03K 17/567 |
| | | | 327/430 |
| 8,994,442 B2 | 3/2015 | Konstantinov | |
| 9,083,343 B1 | 7/2015 | Li et al. | |
| 9,559,683 B2 * | 1/2017 | Zojer | H02M 7/219 |
| 9,793,260 B2 * | 10/2017 | Zojer | H01L 27/0629 |
| 2007/0216373 A1 * | 9/2007 | Smedley | H02J 3/1842 |
| | | | 323/223 |
| 2008/0192397 A1 * | 8/2008 | Liu | H02M 1/32 |
| | | | 361/86 |
| 2011/0026280 A1 * | 2/2011 | Saruwatari | H02M 5/4585 |
| | | | 363/37 |
| 2012/0105131 A1 * | 5/2012 | Biela | H03K 17/102 |
| | | | 327/430 |
| 2012/0326680 A1 * | 12/2012 | Burns | H02M 3/1588 |
| | | | 323/224 |
| 2014/0145208 A1 | 5/2014 | Rose et al. | |
| 2015/0002125 A1 * | 1/2015 | Kinoshita | H02M 1/32 |
| | | | 323/285 |
| 2015/0098258 A1 * | 4/2015 | Park | H02M 5/4585 |
| | | | 363/37 |
| 2017/0365995 A1 * | 12/2017 | Bahl | H02H 1/0007 |

OTHER PUBLICATIONS

Roberts et al., "Thermal and Electrical Performance of CMOS Driver Compatible GaN Power Transistors", IGaN Systems Inc., pp. 1-4, Jun. 23, 2016.

* cited by examiner

AUTOMATIC SHORT CIRCUIT PROTECTION SWITCHING DEVICE SYSTEMS AND METHODS

BACKGROUND

The present disclosure generally relates to electrical systems and, more specifically, to switching devices used in an electrical system.

Generally, in operation, an electrical system may supply electrical power output from a power source to an electrical load, such as an electronic device, a machine, and/or equipment. To facilitate controlling supply of electrical power to the electrical load, the electrical system may include one or more switching devices. For example, one or more switching devices may be included in a relay and/or a circuit breaker electrically coupled between the power source and the electrical load. Additionally or alternatively, one or more switching devices may be included in a power converter electrically coupled between the power source and the electrical load. In operation, the power converter may selectively open and close one or more switching devices to convert electrical power output from the power source into electrical power with target characteristics to be supplied to the electrical load.

In some instances, one or more short circuits may be present during operation of the electrical system, for example, in the power source, the electrical load, and/or the power converter. When present, a short circuit may affect operation of the electrical system, for example, by causing arcing and/or supply of electrical power to an electrical component (e.g., the electrical load and/or a switching device) with electrical characteristics varying from target electrical characteristics. Thus, when a short circuit is expected to be present, electrical power may be disconnected from the electrical load, for example, by maintaining one or more switching devices in the power converter in an open position. However, duration the electrical system operates with a short circuit present may increase magnitude and/or likelihood of the short circuit affecting current and/or subsequent operation of the electrical system.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an electrical system includes a power source that outputs electrical power with first electrical characteristics; an electrical load that operates using electrical power with second electrical characteristics; and a power converter, which includes switching device, electrically coupled between the power source and the electrical load. The switching device includes a switching transistor that selectively switches between an open position and a closed position based at least in part on a switching control signal to facilitate converting electrical power with the first electrical characteristics into electrical power with the second electrical characteristics during operation of the power converter; and a first protection transistor electrically coupled in series with the first switching transistor, in which a constant gate voltage is supplied to the protection transistor to maintain the protection transistor in the closed position during operation of the power converter; and the protection transistor automatically limits current flow through the switching device by reducing a gate voltage applied to the switching transistor when a short circuit is expected to be present in the electrical system.

In another embodiment, a method for implementing a switching device to be used in an electrical system includes electrically coupling a drain of a switching transistor to a first terminal of the switching device to enable controlling operation of the switching device based at least in part on a switching control signal supplied to a gate of the switching transistor; electrically coupling a source of the switching transistor to a drain of a protection transistor; electrically coupling a source of the protection transistor to a second terminal of the switching device; and electrically coupling a voltage source between the source and a gate of the protection transistor to enable providing automatic short circuit protection by supplying a constant gate voltage to the second gate that maintains the protection transistor in a closed position and limits current flow through the switching device when a short circuit is expected to be present in the electrical system.

In another embodiment, a tangible, non-transitory, computer-readable medium stores instructions executable by one or more processors in an electrical system. The instructions includes instructions to instruct, using the one or more processors, a switching device in the electrical system to open by supplying a logic low control signal to a switching transistor in the switching device and to close by supplying a logic high control signal to the switching transistor; instruct, using the one or more processors, a voltage source to supply a constant gate voltage to a gate of a protection transistor connected in series with the switching transistor in the switching device via a voltage control signal, in which the constant gate voltage maintains the protection transistor closed; causes a negligible voltage drop across the protection transistor when current flow through the switching device is below a current threshold to enable controlling operation of the switching device via the logic low control signal, the logic high control signal, or both; and causes a substantial voltage drop across the protection transistor that limits the current flow through the switching device by reducing a gate voltage applied to the switching transistor when the current flow is above the current threshold.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
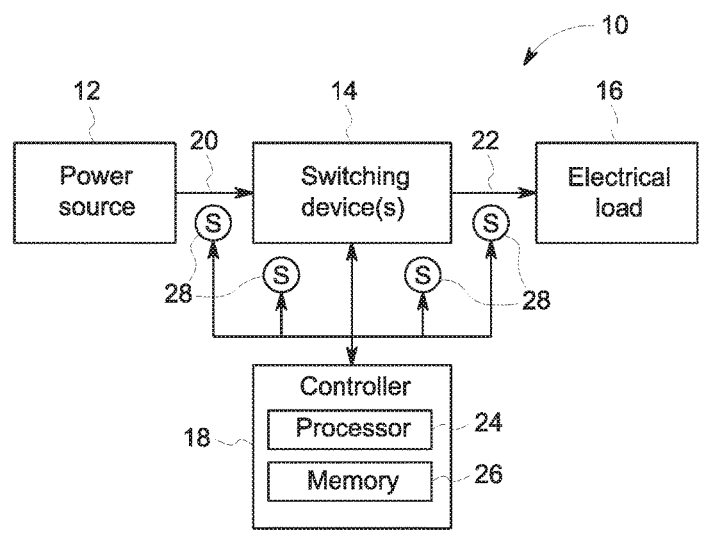
FIG. 1 is a block diagram of an electrical system, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates to switching devices implemented in electrical systems. As mentioned above, one or more switching devices may be included in an electrical system to facilitate controlling supply of electrical power from a power source to an electrical load. In particular, when in a closed position, a switching device may conduct current, thereby connecting electrical power. On the other hand, when in an open position, the switching device may block current, thereby disconnecting electrical power. Thus, in some instances, one or more switching devices may be included in a relay and/or a circuit breaker electrically connected between the power source and the electrical load.

Additionally or alternatively, one or more switching devices may be included in a power converter electrically connected between the power source and the electrical load, for example, to facilitate supplying electrical power with target electrical characteristics to the electrical load. Generally, electrical components, such as the electrical load and/or a switching device, may be designed to operate using electrical power with target electrical characteristics, such as target type (e.g., AC or DC), target voltage, and/or target current. However, in some instances, electrical characteristics of electrical power output by the power source may differ from the target electrical characteristics with which the electrical load is designed to operate. For example, the power source may output alternating current (AC) electrical power while the electrical load is designed to operate using direct current (DC) electrical power.

Thus, to facilitate operating the electrical load, the power converter may convert electrical power output from the power source into electrical power with the target electrical characteristics by selectively opening and closing one or more switching devices. For example, the power converter may include two or more branches (e.g., phase legs) each including a first switching device electrically coupled between an AC bus and a positive DC bus and a second switching device electrically coupled between the AC bus and a negative DC bus. To convert AC electrical power into DC electrical power, the power converter may alternatingly open and close the first switching device and the second switching device on each branch.

During operation, in some instances, one or more short circuits may be present in the electrical system, for example, in the power converter, the electrical load, and/or the power source. When present, a short circuit may result in supplying electrical power with electrical characteristics varying from target electrical characteristics to one or more electrical components, such as the electrical load and/or a switching device. For example, a short circuit may cause current greater than a target current range to be supplied to a switching transistor in the power converter, which may result in the switching transistor operating out of saturation. Supplying the switching transistor current greater than its target current range may also result in a voltage drop across the switching transistor greater than a target voltage range, which may affect lifespan and/or operational reliability of the switching transistor. Additionally or alternatively, the short circuit may cause arcing in the electrical system, which affects lifespan and/or operational reliability of the electrical components and/or surrounding mechanical components.

Thus, when a short circuit is expected to be present, the electrical system may cease operation by disconnecting electrical power from the electrical load. For example, a controller may determine whether a short circuit is expected to be present by monitoring operational parameter (e.g., current and/or voltage) measurements received from one or more sensors. Additionally, when a short circuit is expected to be present, the controller may instruct one or more switching devices electrically connected between the power source and the electrical load to switch from a closed position to an open position and/or remain in the open position, for example, by supplying a logic low control signal to each of the switching devices.

In this manner, the controller may facilitate providing the electrical system active short circuit protection. However, measuring operational parameters using a sensor, communicating sensor data indicating the measured operational parameters from the sensor to the controller, analyzing the sensor data, and/or communicating a control signal to a switching device may generally be less than instantaneous. In other words, using the controller to provide active short circuit protection may result in some delay between when the short circuit initially occurred and when electrical power is subsequently disconnected.

However, magnitude and/or likelihood of a short circuit affecting operation may increase the longer the electrical system operates while the short circuit is present. In fact, when implemented in high voltage electrical systems, duration wide-bandgap switching transistors may operate using electrical power varying from target electrical characteristics before lifespan is substantially affected may be short, for example, due to high DC bus voltage and/or high voltage (e.g., 20V) of a logic high switching control signal. In other words, short circuit withstand time of a wide-bandgap switching transistor, such as a silicon carbide (SiC) metal-oxide semiconductor field-effect transistor (MOSFET), may be relatively short.

Accordingly, the present disclosure provides techniques to improve short circuit protection for an electrical system by reducing magnitude and/or likelihood of a short circuit affecting operation of the electrical system, for example, by reducing duration the electrical system operates while the short circuit is present. In some embodiments, switching devices in the electrical system may provide automatic short circuit protection. For example, a switching device may include a switching transistor and a protection transistor coupled in series source to drain. Additionally, a variable voltage source may be electrically coupled between the gate and source of the protection transistor.

To operate the switching device, a controller may instruct the variable voltage source to apply a specific voltage to the gate of the protection transistor, for example, via a voltage control signal. In some embodiments, the gate voltage applied to the protection transistor may be relatively constant and maintain the protection transistor in a closed position. Thus, in some embodiments, the controller may determine a target gate voltage to be applied based at least in part on operational characteristics of the protection transistor. Since the protection transistor is maintained in a closed position, the controller may generally control operation (e.g., opening and/or closing) of the switching device, for example, via a switching control signal supplied to the switching transistor.

To facilitate providing automatic short circuit protection, the protection transistor may be selected to have different operational characteristics (e.g., $I_{DS}$ vs. $V_{GS}$ vs. $V_{DS}$) compared to the switching transistor. For example, when a wide-bandgap transistor, the voltage drop across the switching transistor may more gradually increase as current increases. Comparatively, when operating in an ohmic (e.g., linear) mode, the operational characteristics of the protection transistor may include an inflection point, such that voltage drop across the protection transistor changes at a slower rate when operating below the inflection point and at a faster rate when operating above the inflection point. In other words, an increase in current flow may result in voltage drop more gradually increasing when the current flow is less than a current corresponding with the inflection point and more rapidly when the current flow is greater than the current corresponding with the inflection point.

Thus, when current though the switching device substantially increases (e.g., due to a short circuit) the voltage drop across the protection may rapidly increase, thereby increasing source voltage of the switching transistor and, thus, reducing gate voltage applied to the switching transistor. In this manner, the switching device may provide short circuit protection by automatically limiting current flow through the switching device and, thus, the switching transistor. In fact, in some embodiments, the protection transistor may be implemented such that the protection transistor reduces the gate voltage of the switching transistor below its threshold voltage to facilitate automatically disconnecting electrical power from the electrical load when current flow through the switching device is indicative of a short circuit being present in the electrical system.

To help illustrate, one embodiment of an electrical system 10 is shown in FIG. 1. In some embodiments, the electrical system 10 may be included in an industrial system, a manufacturing system, an automation system, or the like, such as a factory or plant. Additionally, in some embodiments, the electrical system 10 may be included in a computing system, such as a computer, or an automotive system, such as an airplane, boat, or car.

In the depicted embodiment, the electrical system 10 includes a power source 12, one or more switching devices 14, an electrical load 16, and a controller 18. In some embodiments, the controller 18 may generally control operation of the power source 12, the one or more switching device 14, and/or the electrical load 16. For example, the controller 18 may communicate a switching control signal instructing a switching device 14 to open or close.

To facilitate controlling operation, the controller 18 may include a controller processor 24 and controller memory 26. In some embodiments, the controller memory 26 may include one or more tangible, non-transitory, computer readable media that store data accessible by and/or instructions executable by the controller processor 24. Thus, in some embodiments, the controller memory 26 may include random access memory (RAM), read only memory (ROM), rewritable non-volatile memory (e.g., flash memory), hard drives, optical discs, and/or the like. Furthermore, in some embodiments, the controller processor 24 may include one or more general purpose microprocessors, one or more application specific processors (ASICs), one or more field programmable logic arrays (FPGAs), or any combination thereof. Additionally or alternatively, the controller 18 may utilize analog control based on op-amps and/or other circuitry.

As described above, switching devices 14 may be facilitate controlling supply of electrical power from the power source 12 to the electrical load 16. Thus, as depicted, the power source 12 is electrically connected to the one or more switching devices 14 via a first electrical connection 20. In this manner, the power source 12 may supply electrical power to the one or more switching devices 14. In some embodiments, the power source 12 include an AC power source, such as a power grid, an AC generator, an alternator, and/or the like. Additionally or alternatively, the power source 12 may include a DC power source, such as a DC generator, a battery, and/or the like.

Furthermore, as depicted, the one or more switching devices 14 are electrically connected the electrical load 16 via a second electrical connection 22. In this manner, the one or more switching devices 14 may supply electrical power to the electrical load 16. In some embodiments, the electrical load 16 may store the received electrical power as electrical energy and/or use the received electrical power to perform an operation (e.g., task or function). Accordingly, in some embodiments, the electrical load 16 may include an AC load, such as an AC motor, a heating, ventilating, and air conditioning (HVAC) system, and/or the like. Additionally or alternatively, the electrical load 16 may include a DC load, such as a battery, a computer, an engine control unit, an electronic display, and/or the like.

To facilitate controlling supply of electrical power, the one or more switching devices 14 may selectively connected and disconnect electrical power. For example, in a closed position, a switching device 14 may conduct current, thereby connecting electrical power. On the other hand, when in an open position, the switching device 14 may block current, thereby disconnecting electrical power.

To control operation of a switching device 14, in some embodiments, the controller 18 may communicate a control signal instructing the switching device 14 to switch to and/or maintain an open position or a closed position. In some embodiments, the controller 18 may control operation of the switching device 14 based at least in part on measured operational parameters, such as characteristics of electrical power output from the power source 12, target characteristic of electrical power to be supplied to the electrical load 16, current flow through a switching device 14, voltage drop across the switching device 14, and/or the like. To facilitate measuring the operational parameters, one or more sensors 28 may be disposed in the electrical system 10, for example, on the one or more switching device 14, the first electrical connection 20, and/or the second electrical connection 22. In some embodiments, the sensors 28 may include temperature sensors, pressure sensors, voltage sensors, current sensors, power sensors, or any combination thereof. The sensors 28 may then communicate the measured operational parameters to the controller 18 as sensor data.

As described above, in some embodiments, the one or more switching devices 14 may be included in a relay and/or a circuit breaker. Additionally or alternatively, the one or more switching devices 14 may be included in a power converter. As described above, a power converter may facilitate converting electrical power received from the power source 12 into electrical power with target electrical characteristics to be supplied to the electrical load 16.

Figure 2:
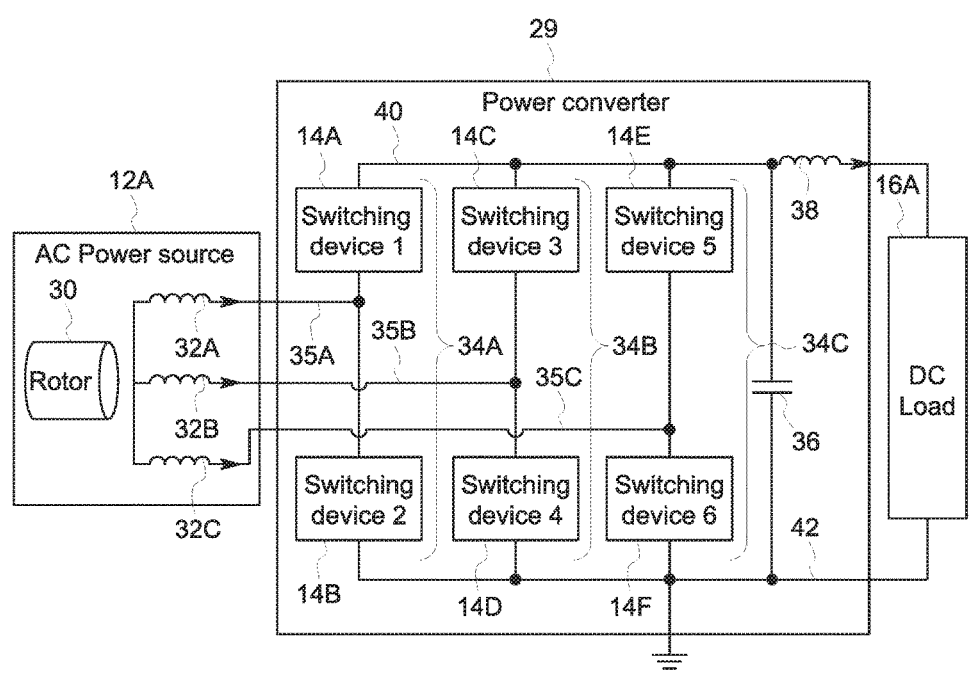
FIG. 2 is a schematic diagram of the electrical system of FIG. 1 including multiple switching devices, in accordance with an embodiment.

To help illustrate, a more detailed view of one embodiment of an electrical system 10 is shown in FIG. 2. In particular, the power source 12 is an AC power source 12A, the electrical load 16 is a DC load 16A, and the one or more switching devices 14 are included in a power converter 29. To facilitate generating AC electrical power, in the depicted embodiment, the AC power source 12A includes a rotor 30 and a stator, which includes a first winding 32A, a second winding 32B, and a third winding 32C. It should be appreciated that this configuration is merely intended to be illustrative. In other words, in other embodiments, the windings 32 may instead be located on the rotor 30.

Nevertheless, with regard to the embodiment depicted in FIG. 2, the rotor 30 may generate a rotor magnetic field, for example, using a permanent magnet or an electromagnet. Additionally, in some embodiments, the rotor 30 may be mechanically coupled to a mechanical energy source, such as an internal combustion engine, a gas turbine, a steam turbine, a wind turbine, and/or the like. Thus, in operation, the mechanical energy source may actuate (e.g., rotate) the rotor 30 and, thus, the rotor magnetic field, which induces voltage in the windings 32.

In some embodiments, the voltage induced in each winding 32 may be used to generate a different phase of the AC electrical power. For example, the rotor 30 may induce a first voltage in the first winding 32A to generate a first phase of the AC electrical power, a second voltage in the second winding 32B to generate a second phase of the AC electrical power, and a third voltage in the third winding 32C to generate a third phase of the AC electrical power. Thus, in the depicted embodiment, the power source 12 may generate three phase AC electrical power. It should be appreciated that the described embodiment is merely intended to illustrative and not limiting. In other words, in other embodiments, the power source 12 may use any number of windings 32 to generate any number of phases.

As described above, the power converter 29 may facilitate converting electrical power received from the power source 12 into electrical power with target electrical characteristics to be supplied to the electrical load 16. Thus, with regard to the depicted embodiment, the power converter 14 may operate to convert three-phase AC electrical power generated by the AC power source 12A into voltage regulated DC electrical power to be supplied to the DC load 16A. To facilitate generating voltage regulated DC electrical power, the power converter 29 may include one phase leg 34 per phase of the AC electrical power and a filter, which, in the depicted embodiment, includes a capacitor 36 and an inductor 38.

With regard to the depicted embodiment, since the power source 12 generates three phase AC electrical power, the power converter 29 includes a first phase leg 34A, a second phase leg 34B, and a third phase leg 34C electrically coupled in parallel between a positive DC bus 40 and a negative (e.g., ground) DC bus 42. As depicted, the first phase leg 34A is electrically connected to the first winding 32A via a first AC bus 35A, which enables the first phase leg 34A to receive the first phase of the AC electrical power from the first winding 32A. Additionally, the second phase leg 34B is electrically connected to the second winding 32B via a second AC bus 35B, which enables the second phase leg 34B to receive the second phase of the AC electrical power from the second winding 32B. Furthermore, the third phase leg 34C is electrically connected to the third winding 32C at a third AC bus 35C, which enables the third phase leg 34C to receive the third phase of the AC electrical power from the third winding 32C.

Additionally, as depicted, each phase leg 34 includes two switching devices 14 electrically coupled between a corresponding AC bus 35, the positive DC bus 40, and the negative DC bus 42. For example, the first phase leg 34A includes a first switching device 14A electrically coupled between the first AC bus 35A and the positive DC bus 40 and a second switching device 14B electrically coupled between the first AC bus 35A and the negative DC bus 42. Additionally, the second phase leg 34B includes a third switching device 14C electrically coupled between the second AC bus 35B and the positive DC bus 40 and a fourth switching device 14D electrically coupled between the second AC bus 35B and the negative DC bus 42. Furthermore, the third phase leg 34C includes a fifth switching device 14E electrically coupled between the third AC bus 35C and the positive DC bus 40 and a sixth switching device 14F electrically coupled between the third AC bus 35C and the negative DC bus 42.

It should be appreciated that the depicted embodiment of the power converter 29 is merely intended to be illustrative and not limiting. In other words, in other embodiment, the power converter 29 may include any suitable number of switching devices 14. For example, the power converter 29 may include one switching device 14, one switching device 14 per phase leg 34, or more than two switching devices 14 per phase leg 34.

To facilitate converting AC electrical power into DC electrical power, the power converter 29 may alternatingly connect an AC bus 35 to the positive DC bus 40 and the negative DC bus 42. As described above, the controller 18 may instruct switching devices 14 to open or close via one or more control signals. Thus, in some embodiments, the controller instruct switching devices 14 on a phase leg 34 to alternatingly open and close via switching control signals. For example, the controller 18 may instruct the first switching device 14A to close while the second switching device 14B is open. Subsequently, the controller 18 may instruct the second switching device 14B to close while the first switching device 14A is open.

As described above, in some instances, a short circuit may occur in the electrical system 10. In particular, a short circuit may occur in the power converter 29 when an AC bus 35 is simultaneously connected to both the positive DC bus 40 and the negative DC bus 42. For example, with regard to the depicted embodiment, a short circuit may occur in the power converter 29 when the first switching device 14A and the second switching device 14B are both closed, the third switching device 14C and the fourth switching device 14D are both closed, and/or the fifth switching device 14E and the sixth switching device 14F are both closed. Additionally or alternatively, a short circuit may occur in the power source 12 and/or the electrical load 16.

In any case, electrical power may be disconnected from the electrical load 16 when a short circuit is expected to be present in the electrical system 10. In some embodiments, the controller 18 may actively provide short circuit protection in the electrical system 10. For example, the controller 18 may receive sensor data from one or more sensors 28 that indicate measured operational parameters, such as current and/or voltage. To determine whether a short circuit is expected to be present, the controller 18 may analyze the sensor data, for example, to monitor voltage drop across a switching device 14 and/or current flow through switching device 14.

Additionally, when a short circuit is expected to be present, the controller 18 may instruct switching devices 14 electrically coupled between the power source 12 and the electrical load 16 to open via one or more switching control signals. For example, the controller 18 may instruct the first switching device 14A, the second switching device 14B, the third switching device 14C, the fourth switching device 14D, the fifth switching device 14E, and the sixth switching device 14F each to switch to an open position and/or remain in the open position, thereby disconnecting electrical power from the DC load 16A. In this manner, the controller 18 may provide active short circuit protection by monitoring measured operational parameters of the electrical system 10 and instructing switching devices 14 to open via control signals.

However, measuring operational parameters using a sensor 28, communicating sensor data indicating the measured operational parameters from the sensor 28 to the controller 18, analyzing the sensor data, and/or communicating a switching control signal to a switching device 14 may generally be less than instantaneous. In other words, using the controller 18 to actively provide short circuit protection may result in some delay between when the short circuit initially occurred and when electrical power is subsequently disconnected. Since magnitude and/or likelihood of a short circuit affecting operation may increase the longer the electrical system 10 operates with the short circuit present, short circuit protection may be improved by reducing duration between when the short circuit initially occurred and when electrical power is subsequently disconnected.

To improve short circuit protection, in some embodiments, one or more switching devices 14 in the electrical system 10 may be implemented to provide automatic short circuit protection. In some embodiments, a switching device 14 may automatically limit (e.g., block) current flow current flow in response to changes in operational parameters expected to result from a short circuit. Thus, in some embodiments, dependency of short circuit protection on measuring operational parameters using a sensor 28, communicating sensor data indicating the measured operational parameters from the sensor 28 to the controller 18, analyzing the sensor data, and/or communicating a switching control signal to a switching device 14 may be obviated. In other words, compared to active short circuit protection, implementing switching devices 14 with automatic short circuit protection may facilitate reducing duration between when the short circuit initially occurred and when electrical power is subsequently disconnected.

Figure 3:
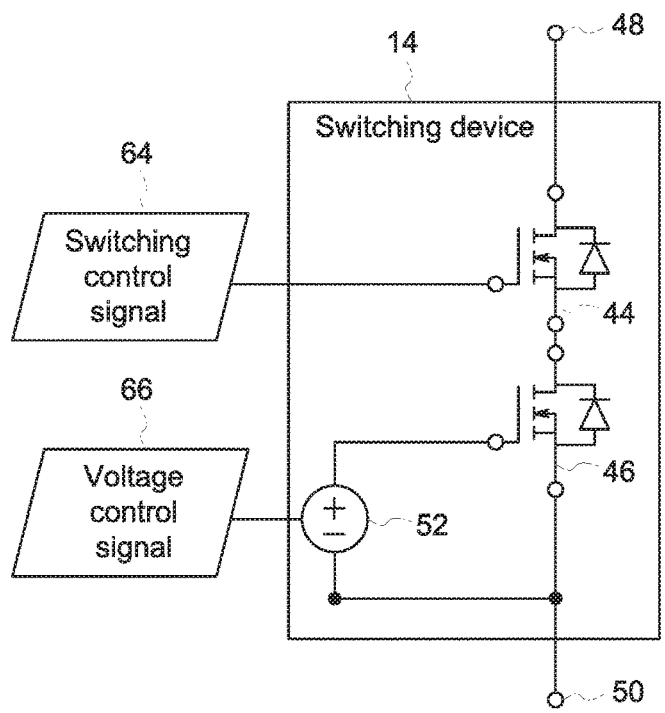
FIG. 3 is a schematic diagram of a switching device of FIG. 2 including a switching transistor and a protection transistor, in accordance with an embodiment.

To help illustrate, one embodiment of a switching device 14 that may be used to provide automatic short circuit protection is shown in FIG. 3. As depicted, the switching device 14 includes a switching transistor 44 and a protection transistor 46 coupled in series between a first terminal 48 and a second terminal 50. In some embodiments, the drain of the switching transistor 44 may be electrically coupled to the first terminal 48 and the source of the protection transistor 46 may be electrically coupled to the second terminal 50. Additionally, the source of the switching transistor 44 may be electrically coupled to the drain of the protection transistor 46.

Furthermore, as depicted, a voltage source 52 is electrically coupled between the gate and source of the protection transistor 46. In the depicted embodiment, the voltage source 52 is depicted as being internal to the switching device 14. However, in other embodiments, the voltage source 52 may be external from the switching device 14, for example, to facilitate supplying gate voltage to protection transistors 46 included in multiple switching devices 14.

Figure 4:
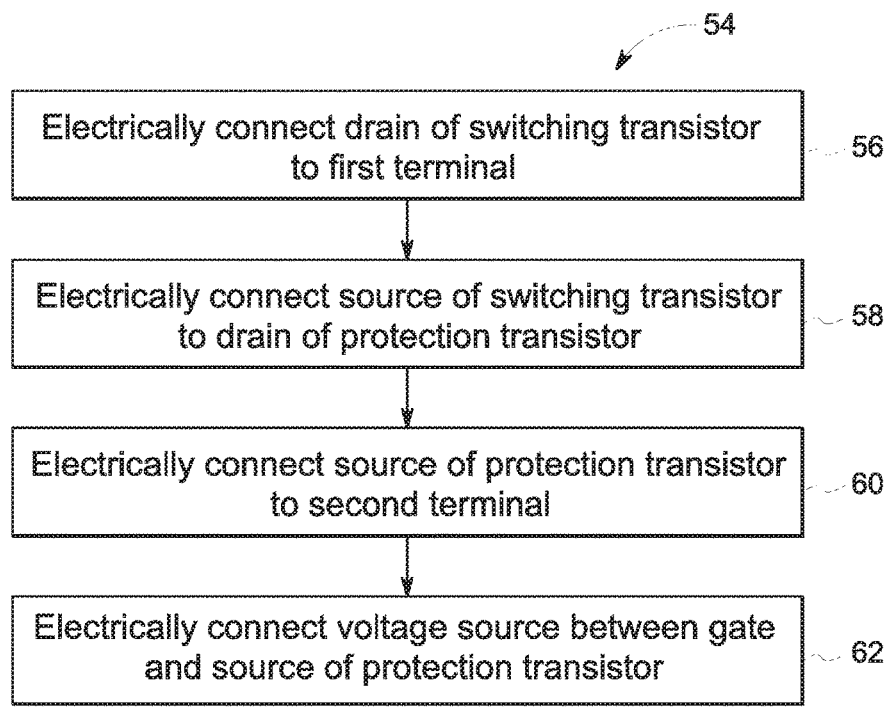
FIG. 4 is a flow diagram of a process for implementing the switching device of FIG. 3, in accordance with an embodiment.

Thus, one embodiment of a process 54 for manufacturing a switching device 14 that provides automatic short circuit protection is described in FIG. 4. Generally, the process 54 includes electrically connecting a drain of a switching transistor to a first terminal (process block 56), electrically connecting a source of the switching transistor to a drain of a protection transistor (process block 58), electrically connecting a source of the protection transistor to a second terminal (process block 60), and electrically connecting a voltage source between a gate and the source of the protection transistor (process block 62). In some embodiments, the process 54 may be implemented by a manufacturer of the switching device 14.

Returning to FIG. 3, to control operation of the switching device 14, a switching control signal 64 may be supplied to the gate of the switching transistor 44 and a voltage control signal 66 may be supplied to the voltage source 52, for example, from the controller 18. In particular, the switching control signal 64 may instruct the switching transistor 44 to open or close. For example, when the switching control signal 64 is a logic high (e.g., 20V), the switching transistor 44 may switch to a closed position and/or maintain the closed position. On the other hand, when the switching control signal 64 is a logic low (e.g., 0V), the switching transistor may switch to an open position and/or maintain the open position.

Additionally, the voltage control signal 66 may instruct the voltage source 52 to supply a specific gate voltage (e.g., $V_{GS}$) to the protection transistor 46. In some embodiments, the gate voltage applied to the protection transistor 46 may be relatively constant and continuously maintain the protection transistor 46 in a closed position during operation of the electrical system 10. In this manner, the controller 18 may generally control operation (e.g., opening and/or closing) of the switching device 14 via the switching control signal 64.

In some embodiments, the switching transistor 44 may be a wide-bandgap transistor, such as a silicon carbide (SiC) metal-oxide semiconductor field-effect transistor (MOSFET), designed (e.g., rated) to operate in saturation. However, when operated out of saturation, voltage drop across the switching transistor 44 may increase relatively proportionally with an increase in current, for example, due to a short circuit in the electrical system 10. Additionally, in some embodiments, the switching transistor 44 may be designed to operate in a high voltage electrical system 10. For example, the switching transistor 44 may be electrically coupled to a positive DC bus 40 that conducts high voltage during operation. Additionally or alternatively, operation of the switching transistor 44 may be controlled using a switching control signal 64 with a high voltage logic high state. As discussed above, when operated in a high voltage electrical system 10, short circuit withstand time of the switching transistor 44 may be relatively short.

To facilitate providing automatic short circuit protection, in some embodiments, the protection transistor 46 may be selected to have operational characteristics different from the switching transistor 44. For example, the protection transistor 46 may be designed to operate using a lower gate voltage compared to the switching transistor 44, which may facilitate reducing power consumption resulting from operation of voltage source 52. Additionally, the protection transistor 46 may exhibit operational characteristics including an inflection point.

Figure 5:
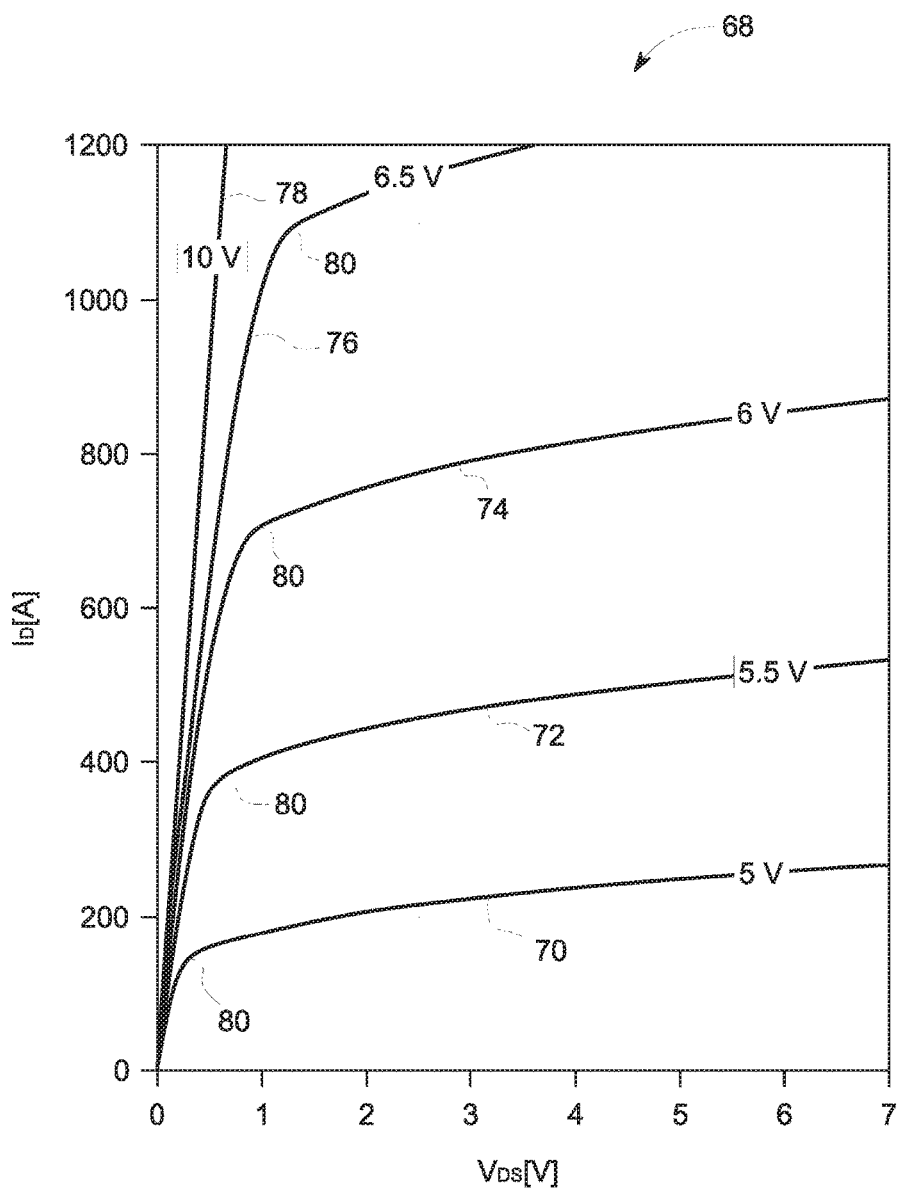
FIG. 5 is a plot describing operational characteristics of the protection transistor of FIG. 3, in accordance with an embodiment.

To help illustrate, a plot 68 describing example operational characteristics of a protection transistor 46 is shown in FIG. 5. As depicted, the plot 68 describes relationship between current (e.g., $I_D$) flow through the protection transistor 46 and voltage (e.g., $V_{DS}$) drop across the protection transistor 46 when different gate voltages are applied. In particular, the plot 68 includes a first curve 70 that describes the relationship when a gate voltage of 5V is applied, a second curve 72 that describes the relationship when a gate voltage of 5.5V is applied, a third curve 74 that describes the relationship when a gate voltage of 6V is applied, a fourth curve 76 that describes the relationship when a gate voltage of 6.5V is applied, and a fifth curve 78 that describes the relationship when a gate voltage of 10V is applied.

Additionally, as depicted, the operational characteristic of the protection transistor 46 includes a first portion and a second portion separated by an inflection point 80. In particular, current flow less than current corresponding with the inflection point 80 results in a more gradual changes in voltage drop, whereas current flow greater than the current corresponding with the inflection point 80 results in a more rapid changes in voltage drop. For example, as described by the third curve 74, voltage drop across the protection transistor 46 more gradually increases when current flow is below the inflection point 80 of approximately 700 A. Additionally, as described by the third curve 74, voltage drop across the protection transistor 46 more rapidly increases when current flow is above the inflection point 80 of approximately 700 A.

Taking advantage of its operational characteristics, the protection transistor 46 may be operated to provide automatic short circuit protection in the switching device 14 of FIG. 3 and, thus, an electrical system 10 including the switching device 14. In particular, voltage drop across the protection transistor 46 may affect drain voltage of the protection transistor 46. Since electrically connected to the source of the switching transistor 44, changes in the drain voltage of the protection transistor 46 may affect source voltage and, thus, gate voltage (e.g., $V_{GS}$) of the switching transistor.

For example, as described by the third curve 74 of FIG. 4, the voltage drop across the protection transistor 46 may be approximately 0.25V when current is 300 A. Thus, when 300 A flow through the switching device 14, source voltage of the switching transistor 44 may increase 0.25V, thereby decreasing gate voltage of the switching transistor 44 by 0.25V. In other words, the protection transistor 46 may have a low on-resistance when current operated below the inflection point 80, which results in reduced and/or minimal (e.g., negligible) impact on operation of the switching transistor 44—particularly when the switching transistor 44 is operated using a high gate voltage (e.g., 20V or greater).

Additionally, as described by the third curve 74, the voltage drop across the protection transistor 46 may be approximately 7V when current is 850 A. Thus, when 850 A flow through the switching device 14, source voltage of the switching transistor 44 may increase 7V, thereby decreasing gate voltage of the switching transistor 44 by 7V. In some embodiments, the decrease in gate voltage may limit current flow through the switching transistor 44 and, thus, the switching device 14. In fact, in some embodiments, the gate voltage may be decreased below a threshold voltage of the switching transistor 44, thereby blocking current flow through the switching transistor 44 and, thus, the switching device 14. In other words, the protection transistor 46 may have a high on-resistance operated above the inflection point 80, which results in drastic (e.g., substantial) impact on operation of the switching transistor 44.

Thus, in some embodiments, the protection transistor 46 may be operated such that the inflection point 80 is indicative of whether a short circuit is expected to be present in the electrical system 10. For example, the protection transistor 46 may be operated such that current below the inflection point 80 results when a short circuit is not present and current above the inflection point 80 results when a short circuit is present. Since the inflection point 80 corresponding with different gate voltages may vary, in some embodiments, gate voltage to be applied to the protection transistor 46 may be determined based at least in part on operational characteristics of the protection transistor 46 and/or operational parameters expected to result from a short circuit.

Figure 6:
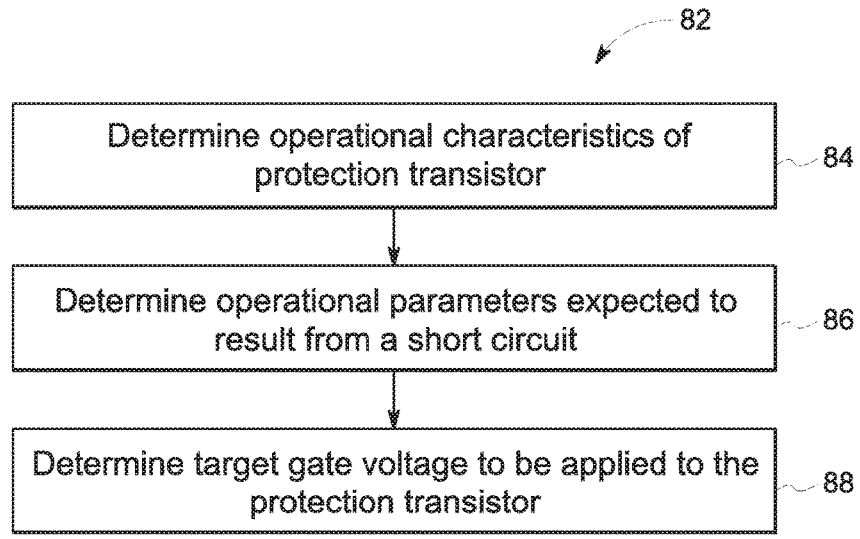
FIG. 6 is a flow diagram of a process for determining control signals to be supplied to the switching device of FIG. 3, in accordance with an embodiment.

To help illustrate, one embodiment of a process 82 for determining operational parameters (e.g., target gate voltage) with which to operate a switching device 14 is described in FIG. 6. Generally, the process 82 includes determining operational characteristics of a protection transistor (process block 84), determining operational parameters expected to result from a short circuit (process block 86), and determining target gate voltage to be applied to the protection transistor (process block 88). In some embodiments, the process 82 may be implemented by executing instructions stored in one or more tangible, non-transitory, computer-readable media, such as controller memory 26 and/or the like, using a processor, such as the controller processor 24 and/or the like.

Accordingly, in some embodiments, the controller 18 may determine operational characteristics of the protection transistor (process block 84). As described above, the operational characteristics may include relationship between current flow through the protection transistor 46 and voltage drop across the protection transistor 46 when different gate voltages are applied. In some embodiments, the operational characteristics may be predetermined and stored, for example, by a manufacturer in the controller memory 26 using one or more look-up-tables (LUTs).

Additionally, the controller 18 may determine operational parameters expected to be occur when the electrical system 10 operates with a short circuit present (process block 86). In some embodiment, value of one or more operational parameters (e.g., voltage and/or current) may be indicative of likelihood that a short circuit is present. Thus, in some embodiments, the controller 18 may determine a first operational parameter range that indicates a high likelihood of a short circuit and a second operational parameter range that indicates a low likelihood of a short circuit separated by an operational parameter (e.g., voltage or current) threshold.

As described above, in some instances, current supplied to electrical components may substantially increase when the electrical system 10 operates with a short circuit present.

Additionally or alternatively, in some instances, voltage drop across electrical components may substantially increase when the electrical system 10 operates with a short circuit present. For example, when operated while a short circuit is present, current flow through and/or voltage drop across a switching device 14 may substantially increase. Thus, in some embodiments, the controller 18 may determine current and/or voltage drop across a switching device 14 expected to occur when the electrical system 10 operates with a short circuit present.

Based at least in part on the operational characteristics and/or the operational parameters expected to result from a short circuit, the controller 18 may determine a target gate voltage to be applied to the protection transistor 46 (process block 88). As described above, in some embodiments, the operational characteristics of the protection transistor 46 may include an inflection point 80 separating a first portion, in which voltage drop changes with a slower rate, and a second portion, in which voltage drop changes with a faster rate. Additionally, in some embodiments, different gate voltages may result in the inflection points 80 occurring at different current flow values.

Thus, in some embodiments, the controller 18 may compare the inflection points 80 corresponding with multiple candidate gate voltages. For example, with regard to the operational characteristics described in FIG. 5, the controller 18 may compare the inflection points 80 resulting from applying a gate voltage of 5V, a gate voltage of 5.5V, a gate voltage of 6V, a gate voltage of 6.5V, and/or a gate voltage of 10V. As described above, in some embodiments, the controller 18 may determine an operational parameter (e.g., current) threshold, which may be indicative of whether a short circuit is present.

Thus, to facilitate providing automatic short circuit protection, the controller 18 may select a candidate gate voltage as the target gate voltage based at least in part on the operational parameter threshold. For example, the controller 18 may select the candidate gate voltage that results in the inflection point 80 closest to an operational parameter threshold. Additionally or alternatively, the controller 18 may select a candidate gate voltage that results in an inflection point 80 greater than the operational parameter threshold to reduce likelihood of inadvertently limiting current when a short circuit is not present. On the other hand, the controller 18 may select a candidate gate voltage that results in an inflection point 80 less than the operational parameter threshold to reduce likelihood and/or duration that the electrical system 10 operates with a short circuit present. Based at least in part on the target gate voltage, the switching device 14 may be operated to provide automatic short circuit protection.

Figure 7:
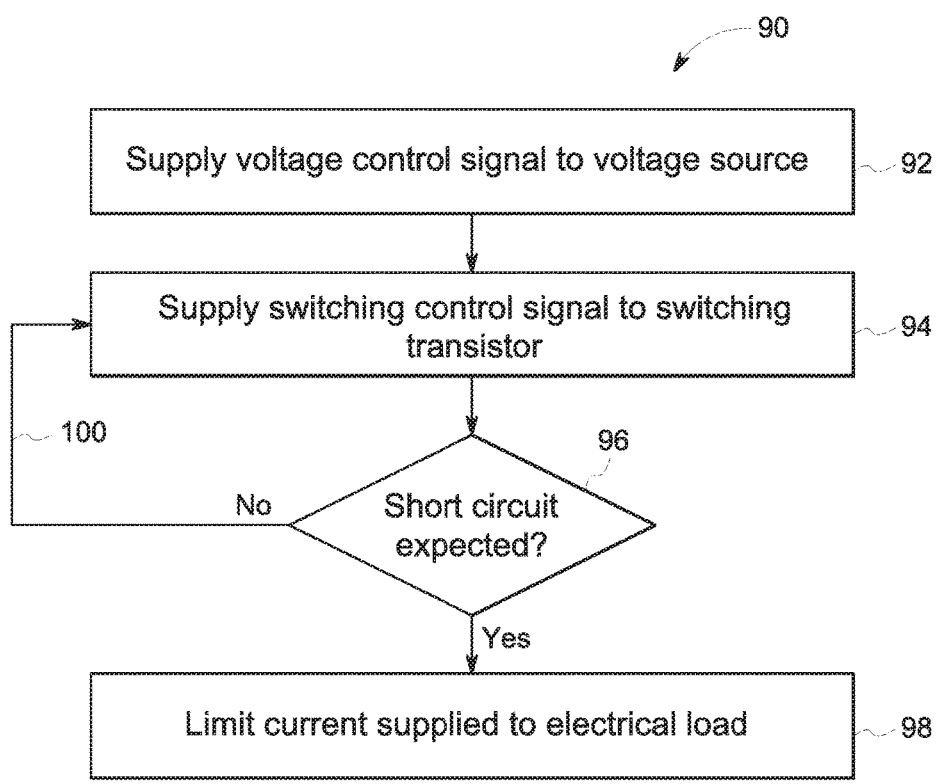
FIG. 7 is a flow diagram of a process for operating the switching device of FIG. 3, in accordance with an embodiment.

To help illustrate, one embodiment of a process 90 for controlling operation of a switching device 14 is described in FIG. 7. Generally, the process 90 includes supplying a voltage control signal to a voltage source (process block 92), supplying a switching control signal to a switching transistor (process block 94), determining whether a short circuit is expected to be present (decision block 96), and limiting current supplied to an electrical load when a short circuit is expected to be present (process block 98). In some embodiments, the process 90 may be implemented by executing instructions stored in one or more tangible, non-transitory, computer-readable media, such as controller memory 26 and/or the like, using a processor, such as the controller processor 24 and/or the like. Additionally or alternatively, portions of the process 90 may be implemented by circuitry (e.g., switching device 14) in the electrical system 10.

Accordingly, in some embodiments, the controller 18 may supply a voltage control signal 66 to the voltage source 52 (process block 92). As described above, the voltage control signal 66 may indicate the target gate voltage to be supplied to the protection transistor 46. In other words, the voltage control signal 66 may instruct the voltage source to supply the target gate voltage to the protection transistor 46.

Additionally, the controller 18 may supply a switching control signal 64 to the switching transistor 44 (process block 94). As described above, the switching control signal 64 may selectively open or close the switching transistor 44. For example, when operated in saturation, the switching control signal 64 may be logic high to instruct the switching transistor 44 to switch to a closed position and/or maintain the closed position. On the other hand, the switching control signal 64 may be a logic low to instruct the switching transistor 44 to switch to an open position and/or maintain the open position. In this manner, the controller 18 may actively control operation of the switching device 14, for example, by alternatingly opening and closing the switching device 14 to facilitate converting AC electrical power into DC electrical power.

During operation, the electrical system 10 may determine whether a short circuit is expected to be present (decision block 96). As described above, in some embodiments, the controller 18 may actively determine whether a short circuit is expected to be present, for example, by monitoring and/or analyzing operational parameters measured by one or more sensors 28. Additionally or alternatively, the switching device 14 may indirectly determine whether a short circuit is expected to be present based at least in part on operational parameters of the switching device 14 relative to an inflection point 80 resulting from supply of the target gate voltage to the protection transistor 46.

When a short circuit is not expected to be present, the controller 18 may continue actively controlling operation of the switching device 14 by supplying the switching control signal 64 to the switching transistor 44 (arrow 100). On the other hand, when a short circuit is expected to be present, the electrical system 10 may limit current supplied to the electrical load 16 (process block 98). As described above, in some embodiments, the controller 18 may actively instruct the switching device 14 to limit current, for example, by supplying a logic low switching control signal 64 instructing the switching transistor 44 to open. In this manner, the controller 18 may provide active short circuit protection by instructing the switching device 14 to disconnect electrical power from the electrical load 16.

Additionally or alternatively, the switching device 14 may automatically limit current, for example, due to an increase in voltage drop across the protection transistor 46 that reduces the gate voltage applied to the switching transistor 44. In some embodiments, the switching transistor 44 may reduce conducted current as the gate voltage applied to the switching transistor 44 decreases. In fact, in some embodiments, the gate voltage may be decreased below the threshold voltage of the switching transistor 44, thereby opening the switching transistor 44 to facilitate disconnecting electrical power from the electrical load.

In this manner, the switching device 14 may provide automatic short circuit protection by automatically limiting current flow through the switching device 14. As described above, in some embodiments, the automatic short circuit protection provided by the switching device 14 may limit current flow through the switching device 14 sooner than the active short circuit protection provided by the controller 18, thereby reducing duration the electrical system 10 operates while a short circuit is present and, thus, magnitude and/or likelihood of the short circuit affecting operation of the electrical system.

Thus, in some embodiments, the automatic short circuit protection provided by the switching device 14 may obviate active short circuit protection provided by the controller 18. Nevertheless, in other embodiments, active short circuit protection may be implemented in addition to the automatic short circuit protection. For example, in some embodiments, the automatic short circuit protection may limit current without completely blocking current flow, thereby potentially resulting in some electrical power being supplied to the electrical load 16. Thus, the active short circuit protection may be implemented to subsequently disconnect electrical power from the electrical load 16, for example, by opening the switching transistor 44.

Accordingly, technical effects of the present disclosure include improving operation of an electrical system by improving short circuit protection. In some embodiments, one or more switching devices in the electrical system may be implemented and operated to provide automatic short circuit protection, for example, by automatically limiting current flow and, thus, supply of electrical from a power source to an electrical load. To facilitate providing automatic short circuit protection, in some embodiments, a switching device may include a switching (e.g., primary) transistor a protection (e.g., secondary) transistor connected in series, for example, source to drain. In some embodiments, the protection transistor may be selected to have operational characteristics (e.g., I-V curves) with plateau, for example, such that current below an inflection point results in more gradual increase of voltage drop across the protection transistor, whereas current above the inflection point results in a more rapid increase of voltage drop.

To actively control operation, the switching device may be instructed to selectively open or close via a switching control signal, for example, output by a controller. Additionally, a voltage source may be electrically connected to the gate of protection transistor to generally maintain the protection transistor in a closed position, for example, by supplying a relatively constant gate voltage based on a voltage control signal output by the controller. In some embodiments, the target gate voltage to be applied to the protection transistor may be determined based at least in part on the resulting inflection point and an operational parameter threshold indicative of whether a short circuit is expected to be present in the electrical system. Thus, in operation, an increase in current above the inflection point (e.g., due to a short circuit) may result in a substantial increase in voltage drop across protection transistor, which reduces gate voltage applied to the switching transistor, thereby limiting current flow through the switching device. In some instances, such automatic short circuit protection may react quicker to a short circuit in the electrical system compared to active short circuit protection, thereby increasing operational reliability, reducing likelihood of a short circuit affecting lifespan of component is the electrical system, and/or reducing duration the electrical system operates with a short circuit present.

This written description uses examples to present techniques of the present disclosure, including the best mode, and also to enable any person skilled in the art to practice the techniques, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An electrical system, comprising:
a power source configured to output electrical power with first electrical characteristics;
an electrical load configured to operate using electrical power with second electrical characteristics;
a power converter electrically coupled between the power source and the electrical load, wherein the power converter comprises a first switching device comprising:
a first switching transistor configured to selectively switch between an open position and a closed position based at least in part on a first switching control signal to facilitate converting electrical power with the first electrical characteristics into electrical power with the second electrical characteristics during operation of the power converter; and
a first protection transistor electrically coupled in series with the first switching transistor, wherein:
a constant gate voltage is supplied to the first protection transistor to maintain the first protection transistor in the closed position during operation of the power converter, and
the first protection transistor is configured to automatically limit current flow through the first switching device by reducing a first gate voltage applied to the first switching transistor when a short circuit is expected to be present in the electrical system; and
a controller communicatively coupled to the power converter, wherein the controller is configured to:
instruct the first switching transistor to switch to the open position or maintain the open position by outputting the first switching control signal with a logic low state;
instruct the first switching transistor to switch to the closed position or maintain the closed position by outputting the first switching control signal with a logic high state; and
determine a target voltage of the constant gate voltage based at least in part on electrical characteristics of the first protection transistor, wherein the electrical characteristics comprise an inflection point when the first protection transistor operates in an ohmic mode.

2. The electrical system of claim 1, comprising a voltage source electrically coupled between a source and a gate of the first protection transistor, wherein the voltage source is configured to:
receive a voltage control signal that indicates a target gate voltage of the first protection transistor, and
supply the constant gate voltage to the gate of the first protection transistor based at least in part on the target gate voltage.

3. The electrical system of claim 1, wherein:
a first drain of the first switching transistor is electrically coupled to a first terminal of the first switching device;
a first gate of the first switching transistor is configured to receive the first switching control signal;
a first source of the first switching transistor is electrically coupled to a second drain of the first protection transistor;
a second gate of the first protection transistor is configured to receive the constant gate voltage; and a second source of the first protection transistor is electrically coupled to a second terminal of the first switching device.

4. The electrical system of claim 1, wherein, when operating in the ohmic mode, the first protection transistor is configured to:
adjust voltage drop across the first protection transistor at a first rate when the current flow through the first switching device changes below the inflection point; and
adjust voltage drop across the first protection transistor at a second rate when the current flow through the first switching device changes above the inflection point.

5. The electrical system of claim 1, comprising a sensor communicatively coupled to the controller, wherein:
the sensor is configured to measure an operational parameter of the electrical system; and
the controller is configured to:
determine whether the short circuit is expected to be present based at least in part on sensor data indicative of the operational parameter received from the sensor; and
output the first switching control signal with the logic low state after the first protection transistor automatically limits the current flow to facilitate disconnecting electrical power from the electrical load when the short circuit is expected to be present.

6. The electrical system of claim 1, wherein:
the first switching device is electrically coupled between a first alternating current (AC) bus and a positive direct current (DC) bus; and
the power converter comprises a second switching device electrically coupled between the first AC bus and a negative DC bus, wherein the power converter configured is configured to:
alternatingly open and close the first switching device and the second switching device to facilitate converting AC electrical power output from the power source into DC electrical power to be supplied to the electrical load; and
open both the first switching device and the second switching device when the short circuit is expected to be present.

7. The electrical system of claim 6, wherein the second switching device comprises:
a second switching transistor configured to selectively switch between the open position and the closed position based at least in part on a second switching control signal; and
a second protection transistor electrically coupled in series with the second switching transistor, wherein:
the constant gate voltage is supplied to the second protection transistor to maintain the second protection transistor in the closed position during operation of the power converter; and
the second protection transistor is configured to automatically limit current flow through the second switching device by reducing a second gate voltage applied to the second switching transistor when the short circuit is expected to be present in the electrical system.

8. The electrical system of claim 6, wherein the power converter comprises:
a third switching device electrically coupled between a second AC bus and the positive DC bus;
a fourth switching device electrically coupled between the second AC bus and the negative DC bus;
a fifth switching device electrically coupled between a third AC bus and the positive DC bus; and
a sixth switching device electrically coupled between the third AC bus and the negative DC bus;
wherein the power converter is configured to open the first switching device, the second switching device, the third switching device, the fourth switching device, the fifth switching device, and the sixth switching device when the short circuit is expected to be present to disconnect electrical power from the electrical load.

9. The electrical system of claim 1, wherein the electrical system comprises an industrial system, a manufacturing system, an automation system, a factory, a plant, computing system, an automotive system, or any combination thereof.

10. A method for implementing a switching device to be used in an electrical system, comprising:
electrically coupling a first drain of a switching transistor to a first terminal of the switching device to enable controlling operation of the switching device based at least in part on a switching control signal supplied to a first gate of the switching transistor;
electrically coupling a first source of the switching transistor to a second drain of a protection transistor electrically coupling a second source of the protection transistor to a second terminal of the switching device; and
electrically coupling a voltage source between the second source and a second gate of the protection transistor to enable providing automatic short circuit protection by supplying a constant gate voltage to the second gate that maintains the protection transistor in a closed position and limits current flow through the switching device when a short circuit is expected to be present in the electrical system;
wherein the constant gate voltage is greater than zero voltage.

11. The method of claim 10, comprising:
electrically coupling the first terminal of the switching device to a direct current (DC) bus in a power converter to enable supplying DC electrical power to an electrical load; and
electrically coupling the second terminal of the switching device to an alternating current (AC) bus in the power converter to enable receiving AC electrical power output from a power source.

12. The method of claim 10, comprising:
communicatively coupling the voltage source to a controller to enable generating the constant gate voltage based at least in part on a voltage control signal that indicates target voltage of the constant gate voltage received from the controller; and
communicatively coupling the first gate of the switching transistor to the controller to enable receiving the switching control signal from the controller.

13. The method of claim 12, comprising:
disposing a sensor in the electrical system to enable the sensor to measure an operation parameter related to operation of the electrical system; and
communicatively coupling the sensor to the controller to enable the controller to provide active short circuit protection by determining whether the short circuit is expected to be present based at least in part on the operational parameter and instruct the switching transistor to maintain an open position via the switching control signal when the short circuit is expected to be present.

14. A tangible, non-transitory, computer-readable medium that stores instructions executable by one or more processors in an electrical system, wherein the instructions comprise instructions to:

instruct, using the one or more processors, a first switching device in the electrical system to open by supplying a logic low control signal to a switching transistor in the first switching device and to close by supplying a logic high control signal to the switching transistor, instruct, using the one or more processors, a voltage source to supply a constant gate voltage to a gate of a protection transistor connected in series with the switching transistor in the first switching device via a voltage control signal, wherein the constant gate voltage:

maintains the protection transistor closed;

causes a negligible voltage drop across the protection transistor when current flow through the first switching device is below a current threshold to enable controlling operation of the first switching device via the logic low control signal, the logic high control signal, or both; and causes a substantial voltage drop across the protection transistor that limits the current flow through the first switching device by reducing a first gate voltage applied to the switching transistor when the current flow is above the current threshold.

15. The computer-readable medium of claim 14, comprising instructions to:

instruct, using the one or more processors, a power converter to convert AC electrical power received from a power source into DC electrical power to be supplied to an electrical load by alternatingly opening and closing the first switching device and a second switching device when a short circuit is not expected to be present in the electrical system, wherein:

the first switching device is electrically coupled between an AC bus and a positive DC bus; and the second switching device is electrically coupled between the AC bus and a negative DC bus; and instruct, using the one or more processors, the first switching device and the second switching device to remain open by supplying the logic low control signal to both the first switching device and the second switching device when the short circuit is expected to be present.

16. The computer-readable medium of claim 14, comprising instructions to:

determine, using the one or more processors, operational characteristics of the protection transistor, wherein the operational characteristics comprise:

relationship between the current flow through the first switching device, voltage drop across the protection transistor, and each of a plurality of candidate gate voltages; and an inflection point corresponding to each of the plurality of candidate gate voltages;

determine, using the one or more processors, the current threshold based at least in part on operational parameters expected to occur when the electrical system operates while a short circuit is present, wherein current above the current threshold indicates that the short circuit is expected to present and current below the current threshold indicates that the short circuit; and determine, using the one or more processors, the constant gate voltage to be applied to the protection transistor by selecting one of the plurality of candidate gate voltages based at least in part on comparison of the inflection point corresponding with each of plurality of candidate gate voltages to the current threshold.

17. The computer-readable medium of claim 16, wherein the instructions to determine the constant gate voltage comprises instructions to select the one of the plurality of candidate gate voltages corresponding to the inflection point closest to the current threshold.

18. The computer-readable medium of claim 16, wherein voltage drop across the protection transistor:

changes at a slower rate when the current flow through the first switching device is less than the inflection point; and changes at a faster rate when the current flow through the first switching device is greater than the inflection point.

19. The computer-readable medium of claim 14, comprising instructions to:

receive, using the one or more processors, sensor data that indicates voltage drop across the switching transistor measured by one or more sensors;

determine, using the one or more processors, whether a short circuit is expected to be present in the electrical system based at least in part on the voltage drop across the switching transistor, and instruct, using the one or more processors, the first switching device to remain open by supplying the logic low control signal to the switching transistor when the short circuit is expected to be present.

* * * * *